W. B. MacDONALD.
BAGGAGE SCALE.
APPLICATION FILED SEPT. 2, 1908.

953,150.

Patented Mar. 29, 1910.
2 SHEETS—SHEET 1.

Witnesses
E. O. Stuart
Herbert D. Lewson

Inventor
William B. MacDonald
By C. A. Snow & Co.
Attorneys

ANDREW B. GRAHAM CO., PHOTO-LITHOGRAPHERS, WASHINGTON, D. C.

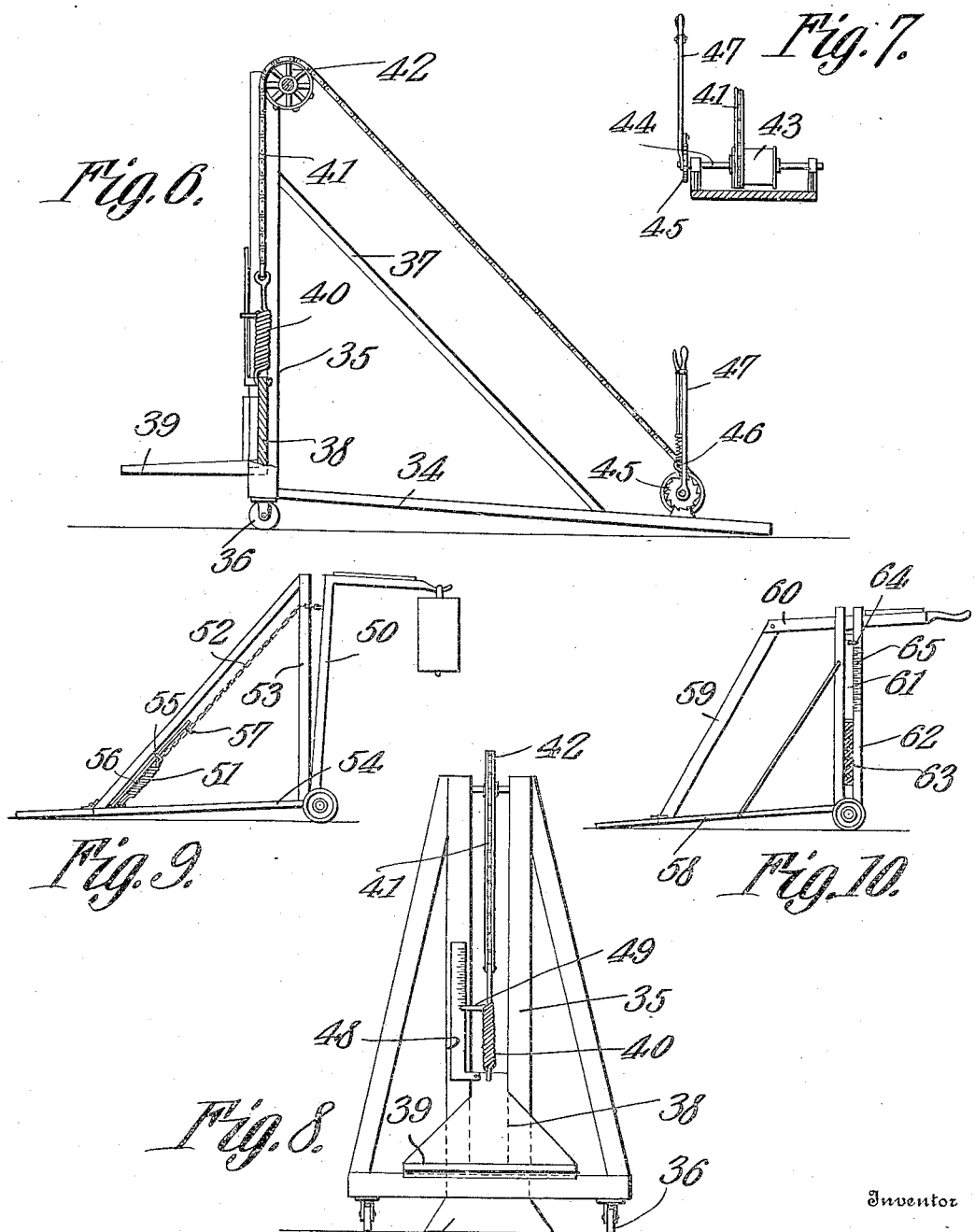

UNITED STATES PATENT OFFICE.

WILLIAM BURT MacDONALD, OF CHARLOTTE, MICHIGAN.

BAGGAGE-SCALE.

953,150. Specification of Letters Patent. Patented Mar. 29, 1910.

Application filed September 2, 1908. Serial No. 451,357.

*To all whom it may concern:*

Be it known that I, WILLIAM BURT MACDONALD, a citizen of the United States, residing at Charlotte, in the county of Eaton and State of Michigan, have invented a new and useful Baggage-Scale, of which the following is a specification.

This invention relates to weighing scales and more particularly to a scale especially designed for weighing trunks, parcels and other baggage.

The object of the invention is to provide a scale including a truck having a weight receiving platform and provided with an overhanging arm adapted to support a trunk or other article during the weighing operation, said arm being operatively connected with a coiled spring having a pointer secured thereto and movable over a graduated scale for indicating the weight of said article.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

Figure 1:
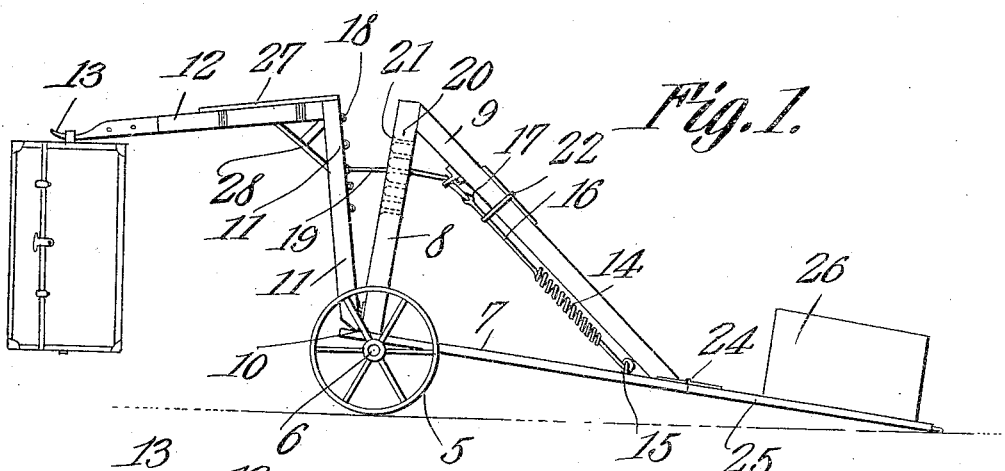
Figure 2:
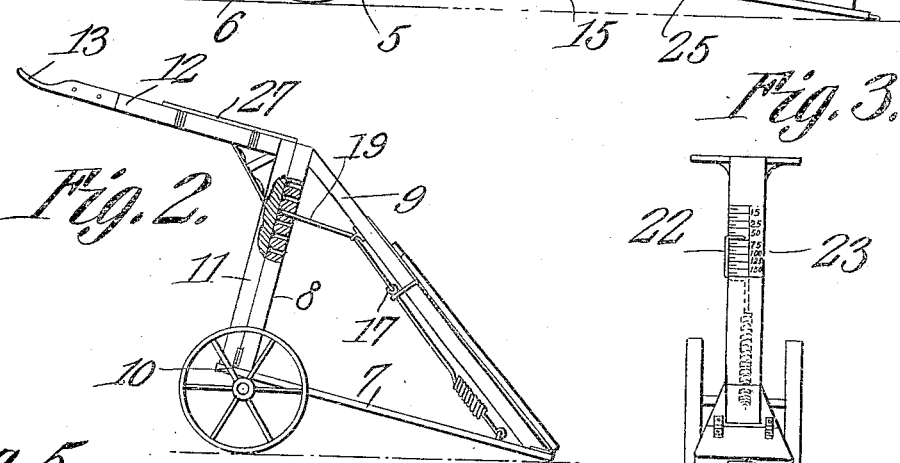
Figure 3:
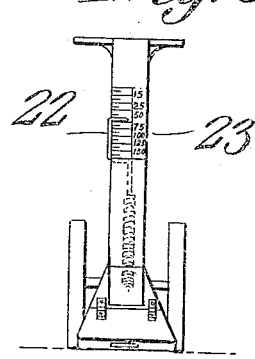
Figures 4, 5:
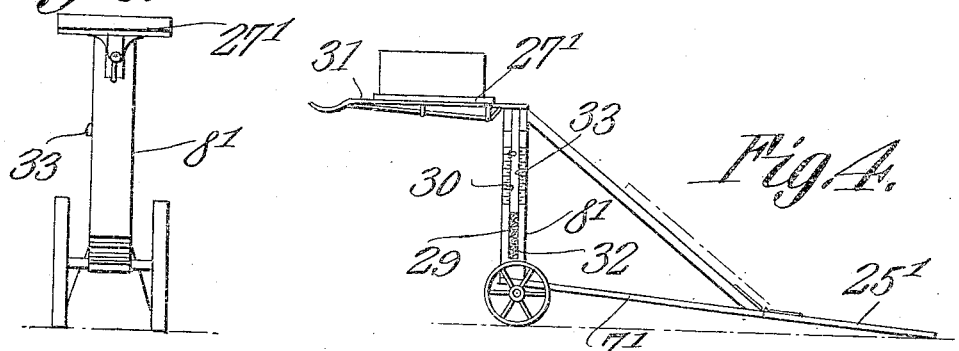

In the accompanying drawings forming a part of this specification: Figure 1 is a side elevation of a baggage scale constructed in accordance with my invention showing the device in operation. Fig. 2 is a similar view showing the weight receiving platform folded upwardly in engagement with the inclined brace to permit ready transportation of the scale. Fig. 3 is an end view of Fig. 1. Fig. 4 is a side elevation illustrating a modified form of the invention. Fig. 5 is a front view of Fig. 4. Fig. 6 is a side elevation partly in section of a modified form of the invention. Fig. 7 is a transverse sectional view of the platform shown in Fig. 6, looking in the direction of the winding drum. Fig. 8 is a front elevation of the device shown in Fig. 6. Fig. 9 is a side elevation illustrating another modification. Fig. 10 is a similar view illustrating a still further modification.

Similar numerals of reference indicate corresponding parts in all of the figures of the drawings.

The improved scale forming the subject matter of the present invention comprises a truck having traction wheels 5 mounted for rotation on an axle 6 and to which is secured a platform 7. Bolted or otherwise rigidly secured to the platform 7 above the axle 6 is a standard 8 to the upper end of which is secured one end of an inclined brace 9, the opposite end of the brace being fastened to the platform 7, as shown.

Pivotally mounted at 10 on the platform 7 is a movable standard 11 having a laterally extending weight supporting member, preferably in the form of an over-hanging arm 12 terminating in a hook 13 adapted to engage the end loop or handle of a trunk when weighing the latter.

Arranged beneath the inclined brace 9 is a coiled spring 14, one end of which is anchored to the platform 7, while the opposite end thereof is extended to form a rod 16 terminating in an eye 17.

Secured to the inner face of the movable standard 11 are a plurality of loops or eyes 18 disposed in vertical alinement and to one of which is secured the adjacent end of a cord, cable or other flexible medium 19, the opposite end of which extends through one of a series of transverse openings 20 formed in the stationary standard 8 for attachment to the eye 17 of the coiled spring.

The mouths of the openings 20 are inclined or beveled at 21 for the reception of the loops 18 when the standard 11 is moved to inoperative position in engagement with the standard 8, as best shown in Fig. 2 of the drawing.

Secured in any suitable manner to the rod 16 is an index finger or pointer 22, the free end of which travels over the surface of a scale 23 graduated to pounds and fractions thereof so as to indicate the weight of an object suspended from the hook of the overhanging arm.

Pivotally mounted at 24 to the rear end of the platform 7 is an auxiliary platform 25 adapted to receive a weight 26 or upon which a person may stand during the weighing operation, thereby to steady the scale and prevent tilting of the truck 7.

When the device is not in use the auxiliary platform 25 may be swung upwardly in engagement with the inclined brace 9 so that the truck may be conveniently transported from place to place.

Secured to the upper longitudinal edge of the arm 12 is a shelf 27 adapted to receive packages or parcels when weighing the same, said arm being reinforced and strengthened by the provision of a diagonally disposed brace 28 extending between the arm 12 and the adjacent movable standard 11, as shown.

In operation the auxiliary platform 25 is swung downwardly to the position shown in Fig. 1 of the drawing and a weight placed thereon, or if desired, the operator may stand on said auxiliary platform. The hook 13 is then passed through the handle of loop of a trunk so as to suspend said trunk from the free end of the arm 12. The weight of the trunk on the arm 12 will move the pivoted standard 11 laterally and thereby cause the cord or cable 19 to exert a longitudinal pull on the coiled spring 14 and through the medium of the pointer 22 indicate the weight of the trunk on the graduated scale 23. When the trunk is removed from the arm 12 the tension of the spring 14 will cause said arm to assume the position shown in Fig. 2 of the drawing, that is to say with the inner face of the movable standard in engagement with the stationary standard 8.

In Figs. 4 and 5 of the drawings there is illustrated a modified form of the invention in which a single rigid standard 8' is employed, the latter being formed with a longitudinally disposed slot 29 for the reception of a movable slide 30 carried by the overhanging arm 31, there being a compression spring 32 interposed between the lower end of the slide 30 and the adjacent end of the slot 29. The overhanging arm 31 is provided with a hook similar in construction to the hook shown in Fig. 1 of the drawings, while the platform 7' is provided with a pivoted extension 25' adapted to receive a weight or upon which the operator may stand during the weighing operation, in the manner before described. In using this form of the scale the box or package is placed on the supporting shelf or platform 27', which causes the slide 30 to bear against and compress the spring 32, there being suitable pointers 33 secured to the slide 30 for indicating the weight of the box or other article on the graduated scale.

In Figs. 6, 7 and 8, another modified construction has been illustrated. In this form of device the platform 34 and the standard 35 are mounted upon wheels 36 preferably in the form of casters, a brace 37 being connected to the standard and platform so as to hold them properly fixed relative to each other. The standard 35 constitutes a guide for a slide 38 from which a shelf 39 extends. Slide 38 is connected by means of a spring 40 with one end of a chain or other flexible element 41 mounted on a wheel 42, such, for example, as a sprocket, the other end of this flexible connection being attached to a drum 43 mounted in suitable bearings on the free end portion of the platform 34. The shaft 44 of this drum has a ratchet-wheel 45 secured thereto and designed to be actuated by a pawl 46 carried by an undulating lever 47. An arm 48 having a scale thereon is carried by and extends upwardly from the slide 38 and a pointer or index 49 is secured to the upper end of the spring 40 and is designed to coöperate with the scale on arm 48 for the purpose of indicating the weight carried by the shelf 39.

By means of the construction shown in Figs. 6, 7 and 8, the trunks or other articles to be weighed can be transferred to and from the scales without the necessity of raising or lowering the trunk, etc., in order to place it upon the scale. This is done by raising or lowering the shelf 39 so as to bring it to the same level as the surface on which the article to be weighed is resting. This adjustment is effected by means of the lever 47 and pawl 46 which, when oscillated, operates to wind or unwind the connection 41 on to or off of the drum 43. It will be seen therefore that the slide 38, spring 40, scale-arm 48 and index or pointer 49 will thus be elevated to any point desired and when the trunk or other article to be weighed is placed upon the shelf 39 said shelf and the scale-arm 48 will move downward and the relative positions of the scale-arm and the index or pointer 49 will change. The pointer and scale will thus coöperate to accurately indicate the weight of the article contained upon the platform or shelf.

In Fig. 9 a still further modified construction has been disclosed, this form being a modification of the structure disclosed in Figs. 1 and 2. In this structure the pivoted standard 50 is connected to a spring 51 by means of a chain or other flexible connection 52 extending through an aperture not shown within the relatively fixed standard 53. Spring 51 is attached at its other end to the platform 54 and carries an index or pointer 55 designed to coöperate with a scale-arm 56. This scale-arm is pivotally connected to platform 54 and has a loop 57 through which the connection 52 loosely extends. In most other respects the construction shown in Fig. 9 is similar to that disclosed in Fig. 2.

In Fig. 10 a further modification has been disclosed, the same being more especially a variation of the structure illustrated in Fig. 4. In this structure the platform 58 has a fixed standard 59 thereon to which an arm 60 is pivotally connected, said arm being in other respects similar to the arm 31. Said arm rests loosely upon a slide 61 mounted within standard 62 and yieldingly supported by a spring 63. An index or pointer 64 is carried by slide 61 and coöperates with a scale 65 on standard 62 for the purpose of indicating the weight of an article placed on arm 60.

Having thus described the invention what is claimed is:

1. A scale including a wheeled truck provided with a weight receiving platform, a standard carried by the truck and provided with an outstanding arm for supporting the article to be weighed, a spring, a flexible element having one end thereof secured to the spring and its opposite end adjustably connected with the standard, and an indicating device movable with the spring and the outstanding arm.

2. A scale including a truck, relatively stationary and movable standards mounted on the truck, counterpoising means operatively connected with the movable standard, an overhanging arm secured to one of the standards, an indicating device, and a flexible connection between the movable standard and the indicating device.

3. A scale comprising a wheeled truck, a rigid platform on said truck, a standard on the platform, a brace between the standard and the platform, an auxiliary counter-weight receiving platform hinged to the rigid platform and adapted to be folded over upon the brace, an over-hanging arm to receive the article to be weighed, means between said arm and the platform to support the arm, load-resisting means, an indicator, and connections whereby the indicator will follow the movements of the outstanding arm.

4. A scale comprising a wheeled truck, a platform on the truck, a standard at one end of the platform, an overhanging arm adapted to receive the article to be weighed and projecting beyond the standard in a direction opposite from the platform, means between the arm and the platform to support the arm, load-resisting means, an indicator, and connections whereby the indicator will follow the movements of said overhanging arm.

5. A scale including a wheeled truck, relatively stationary and movable standards secured to the truck, an over-hanging arm secured to the movable standard and provided with a terminal suspension hook, a coiled spring, a flexible connection between the movable standard and coiled spring, and an indicating device carried by the spring.

6. A scale including a wheeled truck having a rigid platform, an auxiliary weight receiving platform pivotally connected with the rigid platform, relatively stationary and movable standards extending vertically from the rigid platform, a brace connecting the upper end of the stationary standard with the rigid platform and provided with a graduated scale, an arm secured to the movable standard, a coiled spring secured to the rigid platform, a flexible connection between the movable standard and the adjacent end of the spring, and a pointer carried by the spring and movable over the graduations on the brace.

7. A scale including a wheeled truck having a weight receiving platform, a stationary standard mounted on the truck and having a series of transverse openings formed therein, a movable standard having a series of eyes and provided with an over-hanging arm terminating in a suspension hook, a brace extending between the platform and the upper end of the stationary standard, a coiled spring connected with the body of the truck, a flexible medium having one end thereof connected to one of the eyes of the movable standard and its opposite end extending through the adjacent opening in the stationary standard for connection with the adjacent end of the coiled spring, and a pointer carried by the spring and movable over a series of graduations on the inclined brace.

8. A scale including a wheeled truck having a rigid platform, relatively stationary and movable standards secured to one end of the platform, there being a series of transverse openings formed in the stationary standard and having their mouths inclined or beveled at one longitudinal edge of said standard, an over-hanging arm secured to the upper end of the movable standard and terminating in a suspension hook, a series of vertically disposed eyes secured to the inner face of the movable standard and arranged to enter the mouths of the slots at the openings when the scale is in inoperative position, a brace connecting the stationary standard and platform, a spring connected with said platform, a cable secured to one of the eyes and extending through the adjacent transverse opening in the stationary standard for attachment to the adjacent end of the spring, a pointer carried by the spring and movable over a series of graduations on the brace, and a weight receiving platform pivotally connected with the rigid platform and foldable laterally against the inclined brace.

In testimony that I claim the foregoing as my own, I have hereto affixed my signature in the presence of two witnesses.

WILLIAM BURT MacDONALD.

Witnesses:
ELDO MURRAY,
FRANK E. BEARD.